United States Patent
Oh

(10) Patent No.: US 9,133,947 B2
(45) Date of Patent: Sep. 15, 2015

(54) EXCESS FLOW SHUT-OFF DEVICE

(71) Applicant: Kofulso Co., Ltd., Incheon-si (KR)

(72) Inventor: Seung-il Oh, Seoul (KR)

(73) Assignee: KOFULSO CO., LTD., Incheon-Si (KR)

( * ) Notice: Subject to any disclaimer, the term of this patent is extended or adjusted under 35 U.S.C. 154(b) by 118 days.

(21) Appl. No.: 13/940,889

(22) Filed: Jul. 12, 2013

(65) Prior Publication Data

US 2014/0261777 A1    Sep. 18, 2014

(30) Foreign Application Priority Data

Mar. 18, 2013    (KR) .................. 20-2013-0001976

(51) Int. Cl.
*F16K 31/12*    (2006.01)
*F16K 17/34*    (2006.01)

(52) U.S. Cl.
CPC ........... *F16K 17/34* (2013.01); *Y10T 137/7727* (2015.04)

(58) Field of Classification Search
CPC .......................... F16K 17/34; Y10T 137/7727
USPC .......................................... 137/460, 498, 517
See application file for complete search history.

(56) References Cited

U.S. PATENT DOCUMENTS

| | | | | |
|---|---|---|---|---|
| 852,007 A * | 4/1907 | Wilson | .......................... | 303/84.1 |
| 1,001,510 A * | 8/1911 | Curbey | .......................... | 137/517 |
| 1,764,181 A * | 6/1930 | Raetz et al. | .................... | 417/192 |
| 2,522,406 A * | 9/1950 | Smith | .......................... | 137/512.3 |
| 2,526,346 A * | 10/1950 | Goldinger | .................. | 137/512.1 |
| 2,591,060 A * | 4/1952 | Garretson | .................... | 137/513.3 |
| 3,379,213 A * | 4/1968 | Billington | .................. | 137/515.5 |
| 3,469,605 A * | 9/1969 | Courtot et al. | ............... | 137/630 |
| 3,540,469 A * | 11/1970 | Ward | .......................... | 137/512.1 |
| 3,794,077 A * | 2/1974 | Fanshier | .................... | 137/513.3 |
| 3,910,306 A * | 10/1975 | Ohrn | .......................... | 137/498 |
| 4,174,731 A * | 11/1979 | Sturgis et al. | ................. | 137/498 |
| 4,436,111 A * | 3/1984 | Gold et al. | .................... | 137/498 |
| 4,456,029 A * | 6/1984 | McCrum | ....................... | 137/498 |
| 4,465,093 A * | 8/1984 | Gold et al. | .................... | 137/498 |
| 4,830,046 A | 5/1989 | Holt | | |
| 5,293,898 A * | 3/1994 | Masloff | ......................... | 137/517 |
| 5,758,682 A * | 6/1998 | Cain | .......................... | 137/68.14 |
| 6,123,100 A * | 9/2000 | Ward | .......................... | 137/460 |
| 7,591,282 B1* | 9/2009 | Achterman | .................... | 137/498 |
| 2004/0221893 A1* | 11/2004 | Johnson | ......................... | 137/498 |
| 2008/0178946 A1* | 7/2008 | Lea-Wilson et al. | .......... | 137/460 |
| 2009/0107563 A1* | 4/2009 | Eichler | .......................... | 137/460 |

* cited by examiner

*Primary Examiner* — Marina Tietjen
*Assistant Examiner* — Umashankar Venkatesan
(74) *Attorney, Agent, or Firm* — Jacobson Holman, PLLC

(57) ABSTRACT

Disclosed therein is an excess flow shut off device which is operated under the same conditions by integrally modulating an opening and closing member, a support member for supporting the opening and a blocking member for blocking a passage by the opening and closing member. The excess flow shut off device is easy in quality management and allows an easy manufacture of uniform products operating under the same conditions because a support member, a spring, an opening and closing member, a joining member, and a cylindrical member are integrally joined together and modulated.

1 Claim, 3 Drawing Sheets

EXCESS FLOW SHUT-OFF DEVICE

BACKGROUND OF THE INVENTION

1. Field of the Invention

The present invention relates to an excess flow shut off device which prevents water from spouting out by automatically blocking an outlet when a water supply hose is cut or damaged.

2. Background Art

FIG. 1 illustrates U.S. Patent Laid-open No. 2011-0232779 entitled "an excess flow safety shut-off device" which has been filed by the inventor of the present invention. The excess flow safety shut-off device has a structure that a ball 2 blocks an outlet 3 when a hose is damaged so as to occur a fluid flow exceeding a magnetic force of a magnet 1.

However, such an excess flow safety shut-off device according to the prior art has a problem in that there frequently occurs a malfunction that the ball 2 blocks the outlet 3 even in a state where the hose is not damaged because the shut-off device reacts sensitively to the fluid flow.

Moreover, U.S. Pat. No. 4,830,046 discloses an excess flow control valve for blocking an opening and closing member, which is supported by a spring, when there is an abnormal flow of a fluid. However, in case of such shut-off devices including the above-mentioned excess flow control valve, it is difficult to set the opening and closing member to overcome an elastic force of the spring under predetermined conditions because their components are separately manufactured and managed.

For the above reason, the shut-off devices according to the prior arts have a problem in that people avoid using the shut-off devices in spite of usefulness because the shut-off devices are not operated even though the shut-off valve is operated in a normal state or the hose is cut.

Taking a notice that the above-mentioned problem of the excess flow shut-off devices of the prior arts happens because components are not modulated properly for quality management, the inventor created this invention.

SUMMARY OF THE INVENTION

Accordingly, the present invention has been made to solve the above-mentioned problems occurring in the prior arts, and it is an object of the present invention to provide an excess flow shut off device which is operated under the same conditions by integrally modulating an opening and closing member, a support member for supporting the opening and a blocking member for blocking a passage by the opening and closing member.

To achieve the above objects, the present invention provides an excess flow shut off device including: a support member including a cylindrical part which has a fine protrusion formed at an end portion thereof, a connection part protrudingly formed on the cylindrical part; a support part formed at a crisscross portion of an end of the connection part; and a shaft hole formed in the support part; an opening and closing member including a shaft part inserted into the shaft hole, a hemispherical opening and closing part formed at one side of the shaft part and having a diameter larger than the support part, a recess part formed in the opening and closing part, and a joining part formed at the other side of the shaft part; a spring forcedly fit to the shaft part; a joining member inserted and mounted into the joining part 24 and fixed by adhesives in a state where the spring 30 is fit onto the shaft part; a cylindrical member including a packing groove formed on an outer face thereof, a joining hole to which the cylindrical part is inserted in the state where the cylindrical part is coated with the adhesives, and a blocking hole formed at an end of the joining hole; a first packing member of a ring shape forcedly fit onto the packing groove; a metallic connection member including a stepped jaw formed on an inner face thereof, an insertion hole to which the cylindrical member is forcedly inserted, and a spiral part formed at one side of an outer face thereof; a cap member including a first spiral groove screw-coupled with the spiral part, a second spiral groove connected to the hose, and a partition wall for partitioning the second spiral groove from the first spiral groove; and a second packing member of a ring shape forcedly fit onto the first spiral groove.

As described above, because the support member, the opening and closing member, the joining member, and the cylindrical member are integrally joined together and modulated, the excess flow shut-off device according to the present invention is easy in quality management and allows an easy manufacture of uniform products operating under the same conditions, so as to solve the problem of inconvenience due to malfunction.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
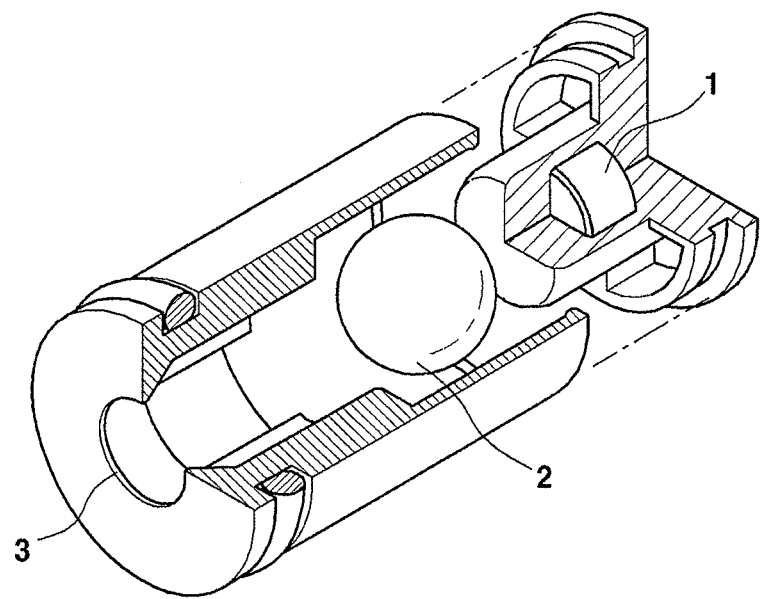
FIG. 1 is a view of an excess flow safety shut off device according to a prior art.
Figure 2:
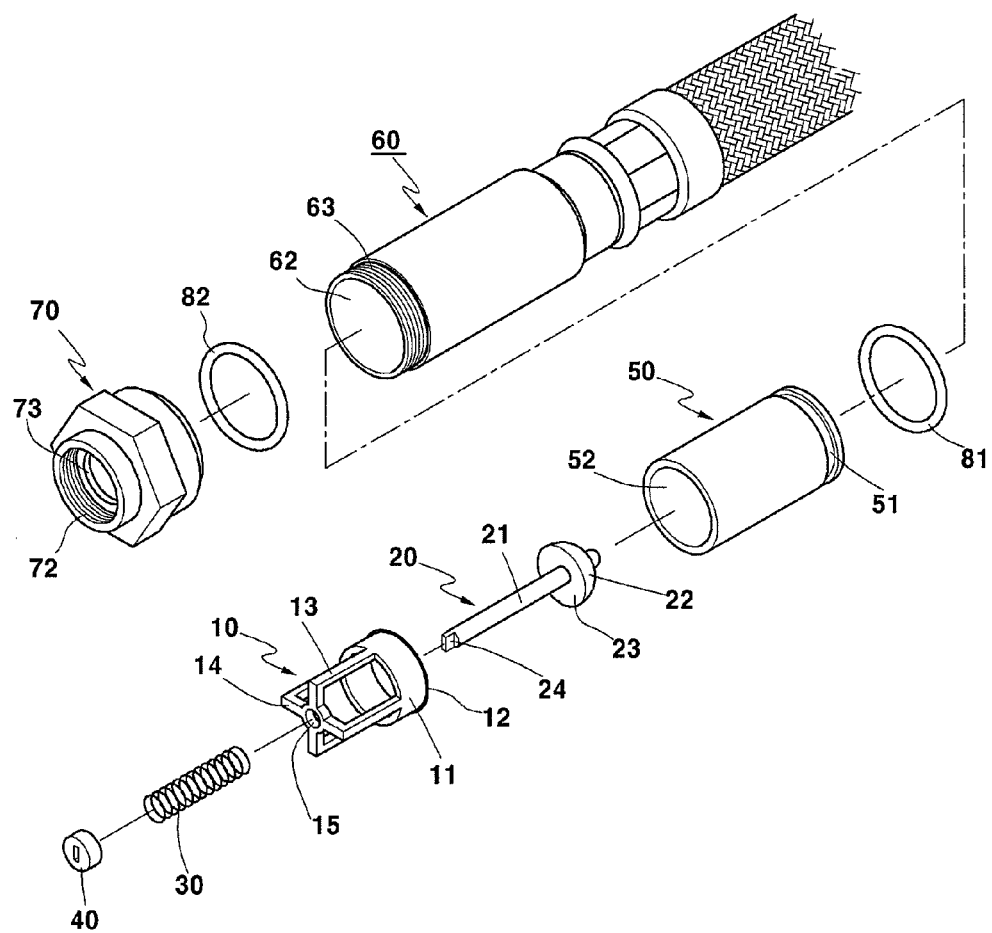
FIG. 2 is an exploded perspective view of an excess flow shut off device according to the present invention.
Figure 3:
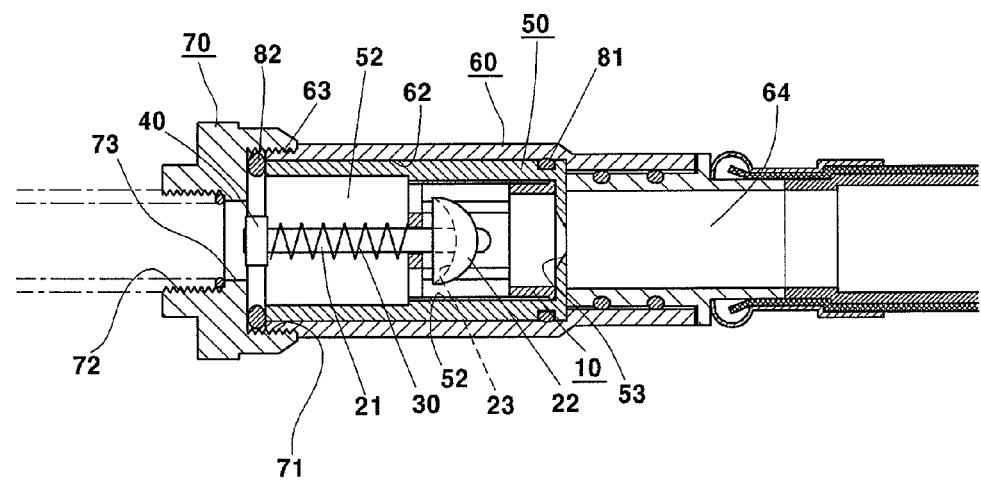
FIG. 3 is a sectional view showing an assembled state of the excess flow shut off device according to the present invention.

As shown in FIGS. 2 and 3, an excess flow shut off device according to the present invention includes a support member 10, an opening and closing member 20, a spring 30, a joining member 40, a cylindrical member 50, a metallic connection member 60, a cap member 70, and first and second packing members 81 and 82.

The support member 10 includes: a cylindrical part 11 having a fine protrusion 12 formed at an end portion thereof; connection parts 13 protrudingly formed on the cylindrical part 11; a support part 14 formed at a crisscross portion of an end of the connection part 13, and a shaft hole 15 formed at the support part 14.

Spaces between the connection parts 13 are passages where a fluid passes.

The opening and closing member 20 includes: a shaft part 21 inserted into the shaft hole 15; a hemispherical opening and closing part 22 formed at one side of the shaft part 21 and having a diameter larger than the support part 14; a recess part 23 formed on the opening and closing part 22, and a joining part 24 formed at the other side of the shaft part 21.

The spring 30 is forcedly fit to the shaft part 21.

In the state where the spring 30 is fit to the shaft part 21, the joining member 40 is joined to the joining part 24. In this instance, the joining part 24 is coated with adhesives, so that the joining member 40 is joined integrally with the opening and closing member 20.

That is, in the state where the spring 30 is forcedly fit to the shaft part 21, one side of the spring 30 is supported by the support part 14 and the other side of the spring 30 is supported by the joining member 40.

The cylindrical member 50 includes: a packing groove 51 formed on an outer face thereof; a joining hole 52 to which the cylindrical part 11 is inserted; and a blocking hole 53 formed at an end of the joining hole.

The cylindrical part 11 is inserted integrally into the joining hole 52 in the state where it is coated with the adhesives, and the fine protrusion 12 serves to prevent the adhesives of the cylindrical part 11 from being stained on the joining hole 52.

A first packing member 81 of a ring shape is forcedly fit to the packing groove 51 so as to keep airtightness of the metal connection member 60.

The metal connection member 60 includes: a stepped jaw 61 formed on an inner face thereof; an insertion hole 50 into which the cylindrical member 50 is inserted and mounted; and a spiral part 63 formed at one side of an outer face thereof.

The cap member 70 includes a first spiral groove 71 screw-coupled with the spiral part 63; a second spiral groove 72 connected to the hose; and a partition wall 73 for partitioning the second spiral groove 72 from the first spiral groove 71.

A second packing member 82 of a ring shape is forcedly fit to the first spiral groove 71 so as to keep airtightness between the cap member 70 and the metal connection member 60.

The excess flow shut-off device according to the present invention is assembled through the steps of fitting the spring 30 onto the shaft part 21, integrally joining the opening and closing member 20 to the support member 10 through the joining member 40, and joining the cylindrical part 11 to the cylindrical member 50.

In the excess flow shut-off device according to the present invention assembled by the above, the support member 10, the opening and closing member 20, the spring 30, the joining member 40, and the cylindrical member 50, which are put in the metallic connection member 60 and are components for blocking a fluid flow when the hose is damaged, are integrally joined together and modulated like a single component.

In the case that there is no error in the hose connected to the metallic connection member 60 and there is no difference in hydraulic pressure between an inlet 54 and an outlet 64, even though a power is applied to the opening and closing member 20 through the recess part 23, because the opening and closing part 22 is spaced apart from the blocking hole 53, the fluid flow progresses normally. In this instance, the fluid flowing into the inlet 54 flows toward the outlet 64 through the spaces between the connection parts 13 and through the blocking hole 53.

Figure 4:
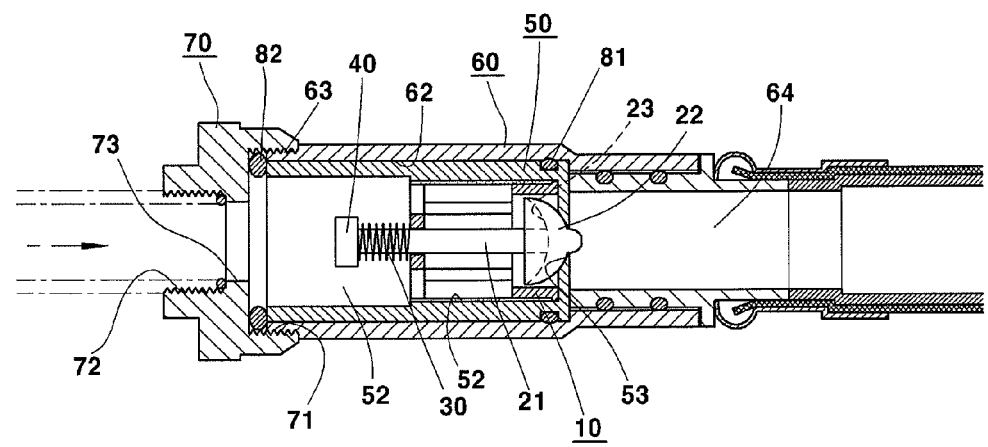
FIG. 4 is a sectional view showing a state where a hose is cut.

FIG. 4 illustrates a state where the opening and closing part 22 blocks the blocking hole 53 when the hose connected to the metallic connection member 60 is cut and hydraulic pressure toward the outlet 64 is reduced momentarily.

When the hose connected to the metallic connection member 60 is cut, because hydraulic toward the outlet 64 is rapidly reduced in a moment but there is no change in hydraulic pressure toward the inlet 54, a power for pushing the shaft part 21 to compress the spring 30 is applied to the recess part 23.

The shaft part 21 is guided by the shaft hole 15 of the support part 14, so that the opening and closing part 22 blocks the blocking hole 53.

In the state where the blocking hole 53 is blocked by the opening and closing part 22, when hydraulic pressure is not applied to the inlet 54 after a user takes some measure, for instance, replaces the hose, the opening and closing member 20 retreats by a restoring force of the spring 30, so that the blocking hole 53 is opened and the shut-off device is restored to its normal state.

Because the support member 10, the opening and closing member 20, the spring 30, the joining member 40, and the cylindrical member 50 are integrally joined together and modulated, the excess flow shut-off device according to the present invention is easy in quality management and allows an easy manufacture of uniform products operating under the same conditions.

While the present invention has been particularly described with reference to attached drawings, it will be understood by those of ordinary skill in the art that the present invention is not limited to the attached drawings and various changes may be made therein without departing from the technical idea of the present invention.

What is claimed is:

1. An excess flow shut off device comprising:
   a support member including a cylindrical part which has an outwardly fine protrusion formed at an end portion thereof, a connection part protrudingly formed on the cylindrical part; a support part formed at a crisscross portion of an end of the connection part; and a shaft hole formed in the support part;
   an opening and closing member including a shaft part inserted into the shaft hole, a hemispherical convex opening and closing part formed at one side of the shaft part and having a diameter larger than the support part, a hemispherical concave part formed in the hemispherical convex opening and closing part, and a joining part formed at the other side of the shaft part;
   a spring forcedly fit to the shaft part;
   a joining member inserted and mounted into the joining part and fixed by adhesives in a state where the spring is fit onto the shaft part;
   a cylindrical member including a packing groove formed on an outer face thereof, a joining hole to which the cylindrical part is inserted in the state where the cylindrical part is coated with the adhesives, and a blocking hole formed at an end of the joining hole;
   a first packing member of a ring shape forcedly fit onto the packing groove;
   a metallic connection member including a stepped jaw formed on an inner face thereof, an insertion hole to which the cylindrical member is forcedly inserted, and a spiral part formed at one side of an outer face thereof;
   a cap member including a first spiral groove screw-coupled with the spiral part, a second spiral groove connected to a hose, and a partition wall for partitioning the second spiral groove from the first spiral groove; and
   a second packing member of a ring shape forcedly fit onto the first spiral groove.

* * * * *